(12) United States Patent
Fath

(10) Patent No.: US 9,221,695 B2
(45) Date of Patent: Dec. 29, 2015

(54) METHODS FOR DECOMPOSING PARTIALLY FLUORINATED AND PERFLUORINATED SURFACTANTS

(75) Inventor: Andreas Fath, Haslach (DE)

(73) Assignee: Hansgrohe SE, Schiltach (DE)

( * ) Notice: Subject to any disclaimer, the term of this patent is extended or adjusted under 35 U.S.C. 154(b) by 1086 days.

(21) Appl. No.: 13/255,207

(22) PCT Filed: Mar. 9, 2010

(86) PCT No.: PCT/EP2010/001444
§ 371 (c)(1),
(2), (4) Date: Nov. 18, 2011

(87) PCT Pub. No.: WO2010/102774
PCT Pub. Date: Sep. 16, 2010

(65) Prior Publication Data
US 2012/0055807 A1    Mar. 8, 2012

(30) Foreign Application Priority Data

Mar. 9, 2009 (DE) .......................... 10 2009 013 380

(51) Int. Cl.
| | | |
|---|---|---|
| C02F 1/46 | (2006.01) | |
| C02F 1/467 | (2006.01) | |
| C02F 1/461 | (2006.01) | |
| C02F 101/30 | (2006.01) | |
| C02F 101/36 | (2006.01) | |

(Continued)

(52) U.S. Cl.
CPC ..... *C02F 1/4672* (2013.01); *C02F 2001/46138* (2013.01); *C02F 2001/46157* (2013.01); *C02F 2101/301* (2013.01); *C02F 2101/36* (2013.01);

*C02F 2103/16* (2013.01); *C02F 2103/30* (2013.01); *C02F 2103/40* (2013.01)

(58) Field of Classification Search
USPC .................................................. 205/688, 742
See application file for complete search history.

(56) References Cited

U.S. PATENT DOCUMENTS 4,443,309 A * 4/1984 Van Duin et al. ............. 588/303
4,702,804 A * 10/1987 Mazur et al. .................. 588/303

(Continued)

FOREIGN PATENT DOCUMENTS

AT    12218      6/1982
DE    2600084    7/1976

(Continued)

OTHER PUBLICATIONS

Carter et al., Oxidative Destruction of Perfluorooctane Sulfonate using Boron-Doped Diamond film electrode, (2008), Environmental Science & Technology, vol. 42, No. 16, pp. 6111-6115.*

(Continued)

*Primary Examiner* — Arun S Phasge
(74) *Attorney, Agent, or Firm* — Duane Morris LLP

(57) ABSTRACT

In a method of decomposing partially fluorinated and perfluorinated surfactants which are, in particular, present in wastewater, sewage sludges and the like, the surfactant is present in solution or suspension and is electrolytically decomposed. An anodic oxidation of the surfactants preferably takes place here. The method is particularly suitable for decomposing perfluorinated alkylsulfonates, in particular PFOS.
The invention also describes an apparatus for electrolytically decomposing partially fluorinated and perfluorinated surfactants.

14 Claims, 2 Drawing Sheets

Figure 1:
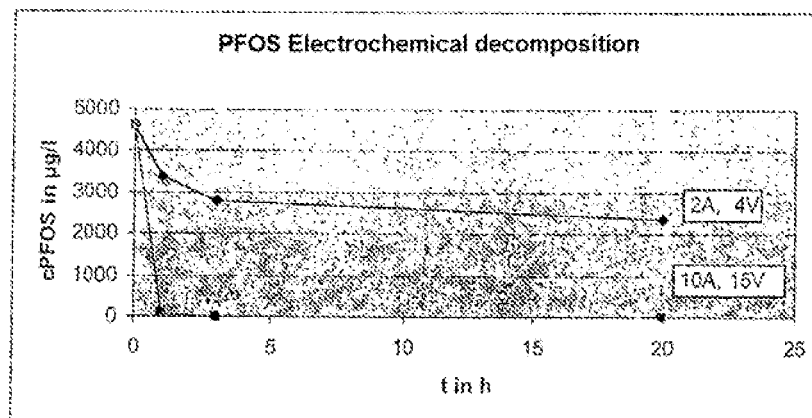

(51) Int. Cl.
*C02F 103/16* (2006.01)
*C02F 103/30* (2006.01)
*C02F 103/40* (2006.01)

(56) References Cited

U.S. PATENT DOCUMENTS

| | | | |
|---|---|---|---|
| 4,954,230 | A | 9/1990 | Kirch |
| 5,364,508 | A | 11/1994 | Weres et al. |
| 5,439,577 | A * | 8/1995 | Weres et al. .......... 204/268 |
| 5,921,113 | A | 7/1999 | Lee et al. |
| 6,315,886 | B1 | 11/2001 | Zappi et al. |
| 2002/0153245 | A1 | 10/2002 | Henuset et al. |
| 2003/0075435 | A1 | 4/2003 | Kemner et al. |
| 2006/0144709 | A1 | 7/2006 | Belt |
| 2007/0138110 | A1 | 6/2007 | Welcker |

FOREIGN PATENT DOCUMENTS

| | | |
|---|---|---|
| DE | 3705956 A1 | 9/1988 |
| DE | 19723869 A1 | 4/1998 |
| WO | 2006061192 A1 | 6/2006 |

OTHER PUBLICATIONS

Kimberly E. Carter and James Farrell, Oxidative Destruction of Perfluorooctane Sulfonate Using Boron-Doped Diamond Film Electrodes, Environ. Sci. Technol., 2008, 42, 6111-6115.

European Patent Office, International Search Report of PCT/EP2010/001444; Completed Jun. 9, 2010.

German Patent and Trademark Office, German Search Report in priority application No. DE102009013380.1; Issued Nov. 24, 2009.

* cited by examiner

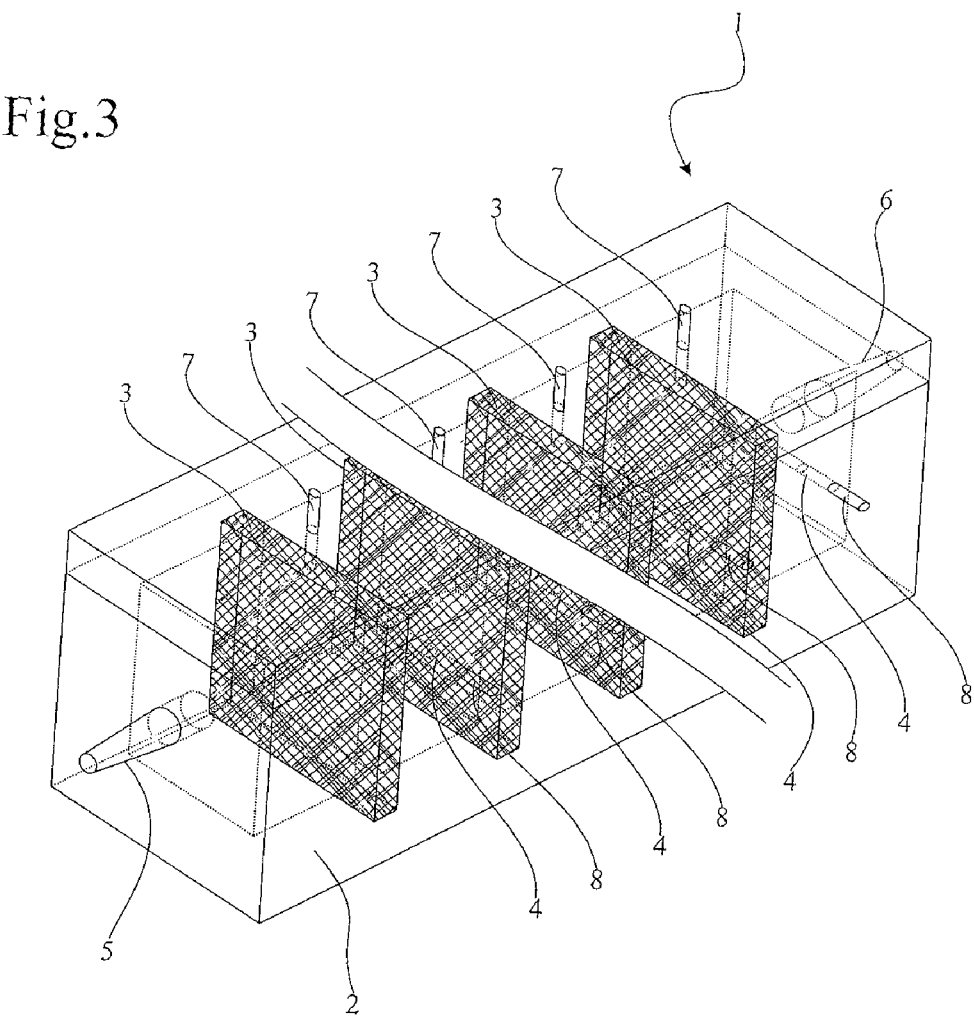

METHODS FOR DECOMPOSING PARTIALLY FLUORINATED AND PERFLUORINATED SURFACTANTS

The invention relates to a method of decomposing partially fluorinated and perfluorinated surfactants.

Perfluorinated surfactants (PFSs) are fluorinated organic compounds on the carbon skeleton of which the hydrogen atoms have been completely replaced by fluorine atoms. The carbon-fluorine bond is the most stable bond in organic chemistry and the perfluorinated surfactants accordingly have a high thermal and chemical stability. They can therefore be decomposed only with difficulty.

Perfluorinated surfactants do not occur naturally and are exclusively produced synthetically. They are used, for example, in the textile industry for producing breathable clothing articles and in the paper industry for producing dirt-, fat- and water-repellent papers. Further fields of use are the photographic industry, the production of fire extinguishing media and aeronautics. They are also used as constituent of lubricants and impregnants and in the production of fluoropolymers.

The use of perfluorinated surfactants is also dominant in the metalization of substrates made of metal or plastic, in particular the use in electroplating. Here, the use of perfluorinated surfactants is widespread in chromium electroplating. Use of perfluorinated surfactants having an appropriate surface activity has hitherto been indispensable for achieving uniform coating of the respective substrates made of plastic or metal (in the sanitary sector usually brass). In this context, the perfluorinated surfactants prevent, firstly, the formation of undesirable chromic acid aerosols. Secondly, the perfluorinated surfactants are used in comparatively large amounts in the metalization of plastics as chemically stable wetting agents in the pickling step (chemical roughening using pickling agents such as chromic acid or chromic/sulfuric acid).

Accordingly, wastewater originating from such metalization processes, in particular chromium plating processes, in particular the rinsing water obtained there, contains these perfluorinated surfactants. In addition, such wastewater/rinsing water also contains, in particular, chromium(VI) due to the abovementioned pickling agents used. Finally, it should be pointed out that such wastewater/rinsing water generally has a distinctly acidic (pH<5) to strongly acidic (pH<2) pH.

Perfluorinated alkylsulfonates (PFASs), in particular, are employed in the abovementioned uses in electroplating, in particular in chromium electroplating. These are perfluorinated surfactants which bear a sulfonate group directly on the perfluorinated hydrocarbon skeleton. The main representative of this group of compounds is perfluorooctanesulfonate (PFOS).

As indicated above, the perfluorinated surfactants accumulate in the environment because of their thermal and chemical stability. This problem has been increasingly recognized in recent years. In this context, reference may be made, merely by way of example, to the press release by the environmental ministry of Baden-Württemberg having the heading "Perfluorierte Tenside (PFT) im Klärschlamm in Baden-Württemberg", which was presented at a press conference on Aug. 3, 2007 in Stuttgart. Information on this theme is also given in the publication from UWSF-Z Umwelt Chem. Öko Tox. 17 (1) 36-49 (2005) on the subject "Risikobewertung von Perfluortensiden als Beitrag zur aktuellen Diskussion zum REACH-Dossier der EU-Kommission". The interim report "Perfluorierte Tenside (PFT) in Baden-Württemberg", August 2008, by the environmental ministry of Baden-Württemberg is also of interest in this respect.

What has been said above also applies analogously to partially fluorinated (generally polyfluorinated) surfactants which are sometimes used as alternatives or substitutes for perfluorinated surfactants.

As a consequence of the abovementioned problems in the use of partially fluorinated/polyfluorinated and perfluorinated surfactants, efforts are already being made at present to reduce the concentration of these materials in, in particular, wastewater, sewage sludges and the like in order to prevent discharge of these materials into the environment. However, the corresponding attempts have hitherto been only partially successful and only to a limited extent.

It is accordingly an object of the invention to provide a method of decomposing partially fluorinated and perfluorinated surfactants, which firstly reliably decomposes these surfactants to a very major extent and secondly can be integrated into an industrial production process without great difficulties. In particular, such a method should be able to be integrated into electroplating processes, preferably into chromium electroplating of substrates made of plastic or metal. Furthermore, an apparatus suitable for carrying out the method should be provided.

This object is achieved by the methods and apparatus set forth in the appended claims, which are hereby incorporated by reference into the present description.

The partially fluorinated and perfluorinated surfactants which can be decomposed according to the invention are present, in particular, in wastewater, sewage sludges and the like. According to the invention, the surfactant is present in solution or suspension and is electrolytically decomposed.

In this context, the abovementioned terms will be explained as follows:

The term decomposition refers to any process in which the abovementioned surfactants are broken up, i.e. converted as chemical compounds into smaller molecules or even into their elements. In the present case, the surfactants mentioned should ideally be broken up or decomposed completely into nontoxic or at least less toxic downstream molecules.

For the purposes of the present invention, perfluorinated surfactants (PFSs) are all organic surface-active compounds in which the hydrogen atoms on the carbon skeleton have been replaced completely by fluorine atoms. Reference is expressly made to the explanations given at the outset. Partially fluorinated surfactants are all organic surface-active compounds in which only part of the hydrogen atoms on the carbon skeleton has been replaced by fluorine atoms. In general, these will be compounds in which more fluorine atoms than hydrogen atoms are present on the carbon skeleton. Accordingly, such compounds can be referred to as polyfluorinated surfactants.

For the purposes of the present invention, a suspension is a heterogeneous mixture of a liquid and solids dispersed therein. A solution is a homogeneous mixture consisting of two or more chemical substances. In particular, for the purposes of the invention, solutions are systems in which one or more substances are dissolved in a liquid solvent. The dissolved substances are uniformly distributed in the solvent and a single-phase system is accordingly present. According to the invention, the liquid of the suspension or the solvent of the solution is preferably water.

The term electrolysis refers to the splitting up or decomposition of a chemical compound under the action of an electric current. The physical and chemical principles of electrolysis are well known to those skilled in the art. In general, an electric direct current is passed through two electrodes into a conductive liquid (electrolyte). At the electrodes, reaction products are formed from the materials present in the electrolyte as a result of the electrolysis. The electrode connected to the plus pole of the voltage source is the anode, and the electrode connected to the minus pole of the voltage source is the cathode.

The method of the invention is advantageously configured so that decomposition of the surfactants to be decomposed occurs by anodic oxidation. Accordingly, the decomposition at the electrode connected as anode occurs with release of electrons. According to the invention, the anodic oxidation of the surfactants can occur at an anode made of any suitable material. However, in these cases the anode preferably comprises titanium, in particular platinum-plated titanium, i.e. titanium coated with a layer of platinum. Preference is likewise given to anodes made of lead or lead alloys.

The current density at which the method of the invention is carried out can in principle be chosen freely. In order to improve the economics of the method, it is generally advantageous to work at ideally high current densities. Accordingly, the method of the invention is generally carried out at a current density of at least 1 $A/dm^2$. Greater preference is given to current densities of at least 3 $A/dm^2$, in particular in the range from 4 to 6 $A/dm^2$.

In the method of the invention, the voltages which are generally applied by means of a rectifier are generally at least 3 V, with voltages of at least 10 V, in particular about 15 V, being more preferred.

The period of time over which the electrolytic decomposition takes place in the method of the invention is not critical in principle. The electrolytic decomposition should be continued until the surfactants have been completely decomposed or decomposed to the desired degree. To integrate the method of the invention into an industrial production process, for example an electroplating process, very short times for carrying out the method are of course sought. Accordingly, the method of the invention is generally carried out over a period of at least 0.5 hour, preferably at least 3 hours. In particular cases, times of at least 10 hours can also be advantageous.

The method of the invention can readily be carried out at room temperature (ambient temperature). It can advantageously be carried out at higher temperatures (higher than room temperature), preferably at temperatures greater than 40° C. In particular, the temperature at which the method is carried out is in the range from 40° C. to 80° C., for example at about 60° C. The higher temperatures generally lead to faster and possibly more complete decomposition of the surfactants.

The heat supplied to and/or evolved in the method can be utilized by means of at least one heat exchanger, for example for preheating the wastewater/rinsing water to be treated.

The perfluorinated surfactants which can be decomposed according to the invention can in principle be divided into the groups of perfluorinated alkylsulfonates (PFASs), perfluorinated carboxylic acids (PFCA) and polyfluorinated telomer alcohols (FTOHs).

Owing to their industrial use, the perfluorinated alkylsulfonates (PFASs) come into question first and foremost for the decomposition method of the invention. The most important representative here is perfluorooctanesulfonate (PFOS) as is used, for example, in electroplating as wetting agent or aerosol binder.

Perfluorooctanesulfonate (PFOS) is an anionic fluorosurfactant which can be employed particularly advantageously but is particularly difficult to analyze and decompose. The extremely hydrophobic perfluoroalkyl group makes PFOS thermally and chemically very inert and it is accordingly attacked neither in strongly acidic nor alkaline nor reducing nor oxidizing media. Although this increases its life in oxidative media, for example in chromic/sulfuric acid, which are used in chromium plating, it makes decomposition very difficult, as mentioned above.

The same applies analogously to perfluorobutane-sulfonate (PFBS).

The variants of the method explained here apply not only to the previously discussed perfluorinated surfactants but also to partially fluorinated/poly-fluorinated surfactants. Among these surfactants, which can likewise be decomposed by the method of the invention, particular mention may at this point be made of H4-perfluorooctylsulfonate (H4 PFOS). This surfactant is also referred to as 1H,1H,2H,2H-perfluorooctylsulfonate.

It is particularly advantageous to treat a particular volume of wastewater (solution/suspension) by the process of the invention. Thus, a batch of such a wastewater is treated in a suitable vessel or reactor until the surfactants therein have been decomposed or destroyed in the desired way.

In a further embodiment, the method of the invention is advantageously carried out continuously. In this way, it can be integrated particularly well into an industrial production process, for example an electroplating process. Here, for example, wastewater containing the surfactants to be decomposed is fed continuously into one or more electrolysis cells and discharged again from these cells after the electrolytic decomposition. This will be explained in more detail in connection with the examples.

In a further embodiment, the method of the invention is advantageously operated as a flow process. This means firstly that the solution or suspension containing the surfactant flows through the apparatus in which the electrolysis takes place, with at least one suitable inlet and at least one suitable outlet being provided. In particular, a constant volume flow at which the suspension or solution is introduced into the corresponding apparatus, for example electrolysis cell, and discharged again therefrom can be provided.

In the method of the invention, at least one electrode, preferably the anode, can preferably be configured in such a way that the solution or suspension can be passed through this electrode. In this way, particularly good contact between this electrode and the solution/suspension to be treated is achieved and particularly effective decomposition of the corresponding surfactants is therefore achieved.

The method of the invention is particularly suitable for decomposing partially fluorinated and perfluorinated surfactants which originate from electroplating wastewater. In particular, the wastewater is wastewater obtained in the chromium plating of metal parts or plastic parts. These metal parts or plastic parts can be, in particular, sanitary articles.

The method of the invention is particularly useful for treating wastewater obtained in the metalization of plastics in the pickling step necessary there, i.e. the chemical roughening of these plastics by means of pickling agents such as chromic acid or chromic/sulfuric acid. The abovementioned partially fluorinated and perfluorinated surfactants are used there in comparatively large amounts as chemically stable wetting agents. They are then present in the wastewater arising there, in particular in rinsing water. In the rinsing water, the surfactants are present in comparatively low concentrations, but these are usually far above the tolerable limit values.

As stated above, the invention can also be defined in that electrolysis is used for decomposing partially fluorinated and perfluorinated surfactants (PFSs) which are present, in particular, in wastewater, sewage sludges and the like. The electrolytic decomposition is preferably effected by anodic oxidation. The information given above in the description is expressly incorporated by reference.

The method of the invention and the use according to the invention are associated with a whole series of advantages. Thus, electrolytic decomposition provides a comparatively easy-to-handle electrochemical method of decomposing partially fluorinated and perfluorinated surfactants. As the examples show, sometimes even complete decomposition of the surfactants is achieved in this way within comparatively short times. The method parameters can be adjusted and reproduced comparatively simply. In addition, the method of the invention has the potential of being integrated into existing production processes. Here, wastewater, in particular wastewater arising in the electroplating processes given particular emphasis above, for example the rinsing water from the chromium pickle in plastics metalization, can be worked up and this may even be carried out continuously.

In addition, further materials present in the solution or suspension may be able to be decomposed or removed by the method of the invention. This can be achieved by reduction at the cathode and/or oxidation at the anode. Thus, it is possible according to the invention to reduce the chromium(VI) present in wastewater or rinsing water from chromium plating at least partly (for example to an extent of 50%) to chromium (III). As a result, a smaller amount of chemicals, e.g. bisulfites (hydrogensulfites) and the like, has to be used in a downstream step for reducing chromium(VI) to chromium(III).

Finally, the invention also encompasses an apparatus for electrolytically decomposing partially fluorinated and perfluorinated surfactants as are present, in particular, in wastewater, sewage sludges and the like. This apparatus is preferably provided for carrying out the above-described method of the invention.

The apparatus of the invention has, apart from other constituents which may be necessary and advantageous for electrolysis, at least one electrode which can be connected as cathode and at least one electrode which can be connected as anode. The information given at the outset on the subject of electrolysis is explicitly incorporated by reference.

According to the invention, the apparatus has at least two electrode pairs consisting of anode and cathode. Here, the electrodes can preferably be configured as plates and/or rods.

In the invention, at least one electrode, preferably the electrode which can be connected as anode, is preferably configured and/or arranged in such a way that a solution or suspension containing the surfactants can be at least partly, preferably entirely, passed through this electrode.

As a result of the abovementioned embodiments of the apparatus of the invention, good contact between the solution or suspension and the respective electrode is ensured. Accordingly, an (ideally) large proportion of the surfactants present in the solution or suspension can be electrolytically decomposed. A very large proportion of the surfactants is then present in the spatial vicinity of the respective electrode surface at which the decomposition process including the electron exchange necessary therefor takes place.

In the cases which are preferred according to the invention, in which the entire solution or suspension is passed through the electrode or electrodes (preferably the anode at which anodic oxidation takes place), the solution or suspension is "forced" to come into contact with the electrode surface. As a result, a very effective electrolytic decomposition of the surfactants occurs. In addition, this decomposition process can be controlled and thus optimized by means of method parameters such as temperature, flow rate and the like.

In a further embodiment, the apparatus of the invention is advantageously configured so that at least two electrode pairs (consisting of anode and cathode) can be arranged or are arranged one after the other or next to one another. In particular, at least four such electrode pairs can be arranged or are arranged one after the other.

As a result, the solution or suspension containing the surfactants comes into contact a number of times with the respective electrodes and the electrolytic decomposition takes place a number of times.

In principle, the electrode pairs mentioned, which could in themselves in each case be referred to as an electrolysis cell, can be able to be arranged or be arranged in any manner one after the other. Such electrode pairs can preferably also be arranged one after the other and/or next to one another in the form of arrays so that many electrolytic decompositions can take place in parallel. Thus, for example, joint introduction of the solution or suspension, for example the wastewater, can be provided; the solution or suspension is then introduced in parallel via suitable branches into rows of electrolysis cells arranged next to one another and, after the appropriate electrolytic decomposition processes, discharged again, optionally via a joint outlet. The electrolysis cells having one or more electrode pairs (consisting of anode and cathode) can be individual or be combined with other pairs in the form of modules. This aids the replacement of individual modules and makes extension or a reduction in size of the total plant possible without a large outlay.

In the apparatus of the invention, preference is also given to at least some of the anodes, preferably all anodes, being titanium anodes. In particular, such anodes can consist of platinum-plated titanium. Preference is likewise given to at least part of the anodes, preferably all anodes, consisting of lead or lead alloys (for example Pb93Sn7).

In cases in which the solution or suspension containing the surfactants is to be passed through the anode, it has to be possible for the solution or suspension to flow through the anodes. These can be, for example, mesh anodes, with a plurality of or many such anode meshes being able to be arranged one after the other. However, in such cases, the anodes are preferably wire compacts in which many wires are pressed together to form an irregular three-dimensional structure. Many open voids or pores through which the solution/suspension can pass are created in this way. Wire thickness, size of the voids, thickness of the compact and the like can be varied.

In conformance with what has been said above, such wire compacts preferably comprise, according to the invention, titanium, preferably platinum-plated titanium. In this case, a titanium wire compact can be made of platinum-plated titanium wire or be platinum-plated subsequently.

Preference is also given, according to the invention, to at least some of the cathodes, preferably all cathodes, being cathodes composed of lead or lead alloys. Here, lead rods are generally used for the purposes of the invention.

The apparatus of the invention can optionally be assigned at least one heat exchanger by means of which the heat supplied to the apparatus and/or evolved therein can be utilized, for example for preheating the wastewater/rinsing water to be treated.

The abovementioned advantages and further advantages of the invention are revealed by the following examples in conjunction with the dependent claims. Here, the individual features can be realized either alone or in combination with one another.

Figure 2:
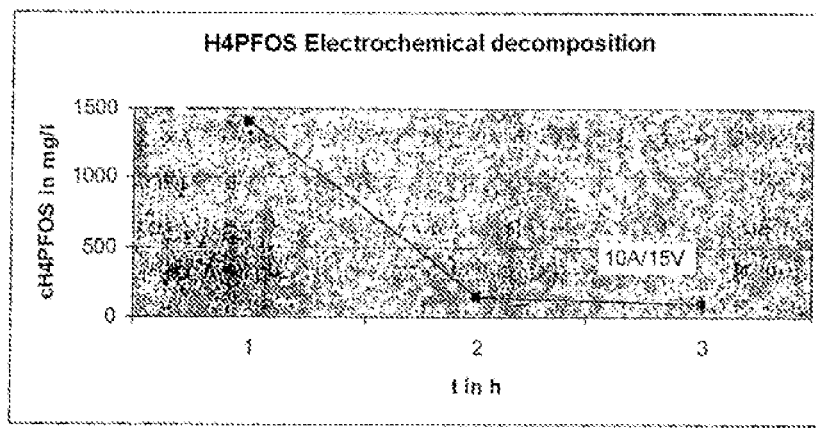

In the drawings,

FIG. 1 shows the electrolytic decomposition of PFOS by a method according to the invention in a graph, FIG. 2 shows the electrolytic decomposition of H4 PFOS by a method according to the invention in a graph and FIG. 3 schematically shows an apparatus according to the invention.

EXAMPLE 1

To test the functionality of the method of the invention, rinsing water, i.e. wastewater with water as solvent, was examined and treated according to the invention. This wastewater comes from the abovementioned chromium pickle of plastic articles to be metalized, with these articles being rinsed with water after the actual pickling step in order to remove the pickling solution completely from the articles. In this way, the surfactants present as wetting agents in the chromium pickle are transferred to the rinsing water and are present in the corresponding wastewater.

Such rinsing water was treated according to the invention on a laboratory scale. For this purpose, 2 liters of wastewater containing either PFOS or H4 PFOS as surfactant were in each case transferred to a glass beaker. The starting concentration of the respective surfactant was determined on a sample. A platinum-plated titanium mesh as anode and a lead rod as cathode were then dipped into the liquid in the glass beaker. The titanium mesh was connected to the plus pole of a rectifier, and the lead rod was connected to the minus pole. Various voltages or currents could be applied by means of the rectifier. The current density could be determined from the current and the area of the titanium mesh.

The results for the electrolytic decomposition of PFOS at room temperature are summarized in table 1.

TABLE 1

| Experiment No. | Designation | Treatment time [h] | $C_{PFOS}$ [µg/l] |
|---|---|---|---|
| 0 | — | — | 4600 |
| 1 | 2 A, 4 V | 1 | 3400 |
| 2 | | 3 | 2808 |
| 3 | | 20 | 2352 |
| 4 | 10 A, 15 V | 1 | 67 |
| 5 | | 3 | 0 |
| 6 | | 20 | 0 |

Experiment No. 0 corresponds to the initial concentration c of PFOS in µg/l. This initial value is 4600 µg/l.

The experiment numbers 1 to 3 correspond to the remaining concentrations of PFOS at an applied voltage of 4 V and a current of 2 A (corresponds to 1 A/dm$^2$). It is found here that the initial concentration of PFOS in the wastewater has virtually halved after electrolytic decomposition for 20 hours.

The experiment numbers 4 to 6 show the remaining concentrations of PFOS at a voltage of 15 V and a current of 10 A (corresponds to a current density of 5 A/dm$^2$). It is found here that under these conditions the PFOS is virtually completely decomposed after only one hour and is completely decomposed after three hours. Within a treatment time of one hour, the PFOS concentration is reduced by 98.5%. After three hours, the PFOS is completely decomposed (100% reduction).

The results shown in table 1 are shown in graph form in FIG. 1.

FIG. 2 correspondingly shows the decomposition of H4 PFOS at room temperature in graph form.

Further experiments and evaluations show, both in the case of PFOS and in the case of H4 PFOS:
- higher current densities generally lead, at a constant initial concentration of the surfactant, to more rapid decomposition, with this effect becoming weaker with increasing current density from a minimum current density;
- higher working temperatures (in general up to 80° C.) generally lead, at a constant initial concentration of the surfactant, to more rapid decomposition, with this effect becoming weaker with increasing temperature;
- the organically bound fluorine in the surfactant is generally converted into fluoride by the method of the invention.

EXAMPLE 2

This example is carried out using an embodiment of the apparatus of the invention, namely the apparatus 1 as per FIG. 3.

As FIG. 3 schematically shows, the apparatus 1 has a housing 2 in which, in the case depicted, four electrode pairs consisting of anodes 3 and cathodes 4 are accommodated. It is indicated schematically in FIG. 3 that the number of four electrode pairs is merely by way of example and it is of course also possible to accommodate more or fewer electrode pairs in the housing 2.

Furthermore, the housing 2 has connections 5 and 6 by means of which the solutions or suspensions to be treated, which contain the surfactants to be decomposed, can be introduced into the housing 2 and discharged again. Finally, FIG. 3 shows electrical connecting elements 7 and 8 by means of which the anodes 3 and cathodes 4 can be contacted and connected to a voltage source, for example a rectifier.

As is likewise shown schematically in FIG. 3, the anodes 3 are arranged in the housing 2 in such a way that the solution or suspension containing the surfactants to be decomposed, i.e., for example, the respective wastewater, which flows through the housing 2 has to flow through these anodes 3. For this purpose, the anodes 3 are, according to FIG. 3, set into the wall of the housing 2 so that no solution/suspension can flow past the anodes 3. This is indicated schematically in FIG. 3, with the dotted lines symbolizing the wall of the housing 2 with its corresponding wall thickness.

To make it possible for the solution/suspension to flow through the anodes 3, the anodes 3 in the present case comprise titanium wire compacts which are additionally platinum-plated, i.e. coated with a layer of platinum. The solution/suspension to be treated then flows through the open voids present in these compacts, with intimate contact of the surfactants present in the solution/suspension with the surfaces of the anodes 3 and thus the electron exchange necessary for the electrolytic decomposition being made possible at the same time.

The cathodes 4 in FIG. 3 have a rod-like shape and in the present case comprise lead.

The housing 2 can in principle be made of various materials. In general, it is advantageous to use polymer materials, for example PVDF (polyvinylidene fluoride), PTFE (polytetrafluoroethylene), PP (polypropylene) or PMMA (polymethyl methacrylate).

The apparatus 1 shown in FIG. 3 was developed for experiments on a laboratory and pilot plant scale. Accordingly, the length of the apparatus 1 was 25 cm, its width was 8 cm and its height was 10 cm. The dimensions of the titanium anodes were 5 cm×4 cm×2 cm.

In example 2, the apparatus 1 was operated with the rinsing water from the chromium pickle for the electroplating of plastic parts, which was also used in example 1, being introduced by means of the connection 5 into the interior of the housing 2. The wastewater was fed in at a uniform volume flow. After the treatment, the wastewater was discharged again from the interior of the housing 2 by means of the connection 6. The volume flow was maintained in an appropriate way by means of a suitable pump (not shown).

The connection elements 7 and 8 of the anodes 3 and the cathodes 4 were connected to a rectifier. In the present case, a current density of 5 A/dm$^2$, based on the anode surface area, was employed. The working temperature was room temperature.

The volume flow of the wastewater was set so that the wastewater entering via the connection 5 reached the outlet 6 in a time of 10 seconds. A total of 5 liters of wastewater were thus circulated and treated over a period of 30 minutes. Analysis indicated that essentially complete (98 percent) decomposition of the surfactants present in the inflowing wastewater could be achieved within this period of time. The same result can also be achieved without circulation by arranging a plurality of cells in series (possibly with a reduced volume of flow).

This shows that the apparatus 1 according to the invention is basically suitable for decomposing partially fluorinated and perfluorinated surfactants. Operation in the flow mode makes it possible for the parent decomposition process and the apparatus to be readily integrated into an industrial electroplating process.

The apparatus 1 has the decisive advantage that it can firstly be operated (continuously) in a flow process and secondly it makes available a large anode surface area at which the electrolytic decomposition of the surfactants can take place. This is also aided by the wastewater to be treated being effectively forced to come into contact with the anode surface area by the flow through the anode(s). The arrangement of a plurality of anodes one after the other (and thus a plurality of reaction spaces/electrolysis cells) makes a very high degree of decomposition through to complete decomposition possible.

FIG. 3 also shows that modular or array-like arrangements are possible by means of apparatuses according to the invention. Thus, for example, a plurality of or many housings having at least one electrode pair consisting of anode and cathode can be arranged one after the other and/or next to one another. This makes it readily possible to work with joint inlets and outlets or separate inlets and outlets for the wastewater.

The invention claimed is:

1. A method comprising decomposing partially fluorinated and perfluorinated surfactants (PFSs) which are, in particular, present in wastewater and sewage sludges, wherein the surfactant is present in at least one of solution and suspension and is electrolytically decomposed, and wherein the decomposition is effected by anodic oxidation which takes place at an anode consisting of at least one of titanium, platinum-plated titanium, lead and lead alloy.

2. The method as claimed in claim 1, wherein the method is carried out at a current density in a range of 1 A/dm$^2$ to 6 A/dm$^2$.

3. The method as claimed in claim 1, wherein the method is carried out at a voltage in a range of 3 V to about 15 V.

4. The method as claimed in claim 1, wherein the method is carried out over a period of at least 0.5 hour to at least 10 hours.

5. The method as claimed in claim 1, wherein the perfluorinated surfactant comprises a perfluorinated alkylsulfonate (PFAS).

6. The method as claimed in claim 5, wherein the perfluorinated alkylsulfonate comprises perfluorooctanesulfonate (PFOS).

7. The method as claimed in claim 5, wherein the perfluorinated alkylsulfonate comprises perfluorobutanesulfonate (PFBS).

8. The method as claimed in claim 1, wherein the partially fluorinated surfactant comprises H$_4$-perfluorooctyl-sulfonate (H$_4$PFOS).

9. The method as claimed in claim 1, wherein the method is carried out continuously.

10. The method as claimed in claim 1, wherein the method is carried out as a flow process.

11. The method as claimed in claim 1, comprising electrolytically decomposing the surfactants using at least one electrode configured in such a way that the at least one of the solution and suspension is passed through this electrode.

12. The method as claimed in claim 1, wherein the surfactants that are decomposed originate from electroplating wastewater.

13. The method as claimed in claim 12, wherein the surfactants that are decomposed originate from wastewater obtained in chromium plating of parts comprising one of metal and plastic parts.

14. The method as claimed in claim 12, wherein the surfactants that are decomposed originate from wastewater obtained in electroplating of sanitary articles.

* * * * *